United States Patent [19]

Doubleday

[11] 4,330,070

[45] May 18, 1982

[54] RELATING TO DOSE DETERMINING MEANS OF PASTE DISPENSER

[75] Inventor: Ian E. Doubleday, Sheffield, England

[73] Assignee: Burroughs Wellcome Co., Research Triangle Park, N.C.

[21] Appl. No.: 138,915

[22] Filed: Apr. 10, 1980

[30] Foreign Application Priority Data

Apr. 10, 1979 [GB] United Kingdom ............... 7912598

[51] Int. Cl.³ .................... B67D 5/22; B67D 5/46
[52] U.S. Cl. ........................... 222/43; 222/44; 222/287; 222/326; 222/391
[58] Field of Search ............... 222/309, 391, 43, 44, 222/48, 472–474, 326–327, 287

[56] References Cited

U.S. PATENT DOCUMENTS

| | | | |
|---|---|---|---|
| 1,643,969 | 10/1927 | Tittemore et al. | 222/309 X |
| 2,104,990 | 1/1938 | Hoefler | 222/309 |
| 3,141,583 | 7/1964 | Mapel et al. | 222/391 X |
| 3,260,419 | 7/1966 | Weimer et al. | 222/309 |
| 3,589,560 | 6/1971 | Wilcox | 222/473 X |
| 3,894,663 | 7/1975 | Carhart et al. | 222/391 X |
| 3,933,273 | 1/1976 | Cox | 222/391 X |

FOREIGN PATENT DOCUMENTS

| | | | |
|---|---|---|---|
| 636394 | 2/1962 | Canada | 222/44 |
| 906964 | 8/1972 | Canada | 222/391 |
| 2343399 | 9/1977 | France | 222/309 |

*Primary Examiner*—Charles A. Marmor
*Attorney, Agent, or Firm*—Trexler, Bushnell & Wolters, Ltd.

[57] ABSTRACT

A paste dose dispenser is provided which incorporates a housing (1) through which passes a drive rod (3) connected to a plunger (4). A lever (14) is pivotally mounted on a pin (15) for movement towards a handle (2), such action causing a plate (9) to tilt and thus grip the rod (3) and drive the rod in a forward direction against the bias of a spring (11). The degree of movement of the lever (14) is determined by the position of the sliding dose adjuster (19) carrying steps (21) which will be engaged by a boss (20) carried by the lever (14). Ball and detent locating means (24) are provided to hold the dose adjusting plate (19) in each of the alternative positions. Fine adjustment of the degree of movement of the lever (14) can be effected by screwing the boss (20) into the handle (14) and securing it by a lock nut (29).

5 Claims, 2 Drawing Figures

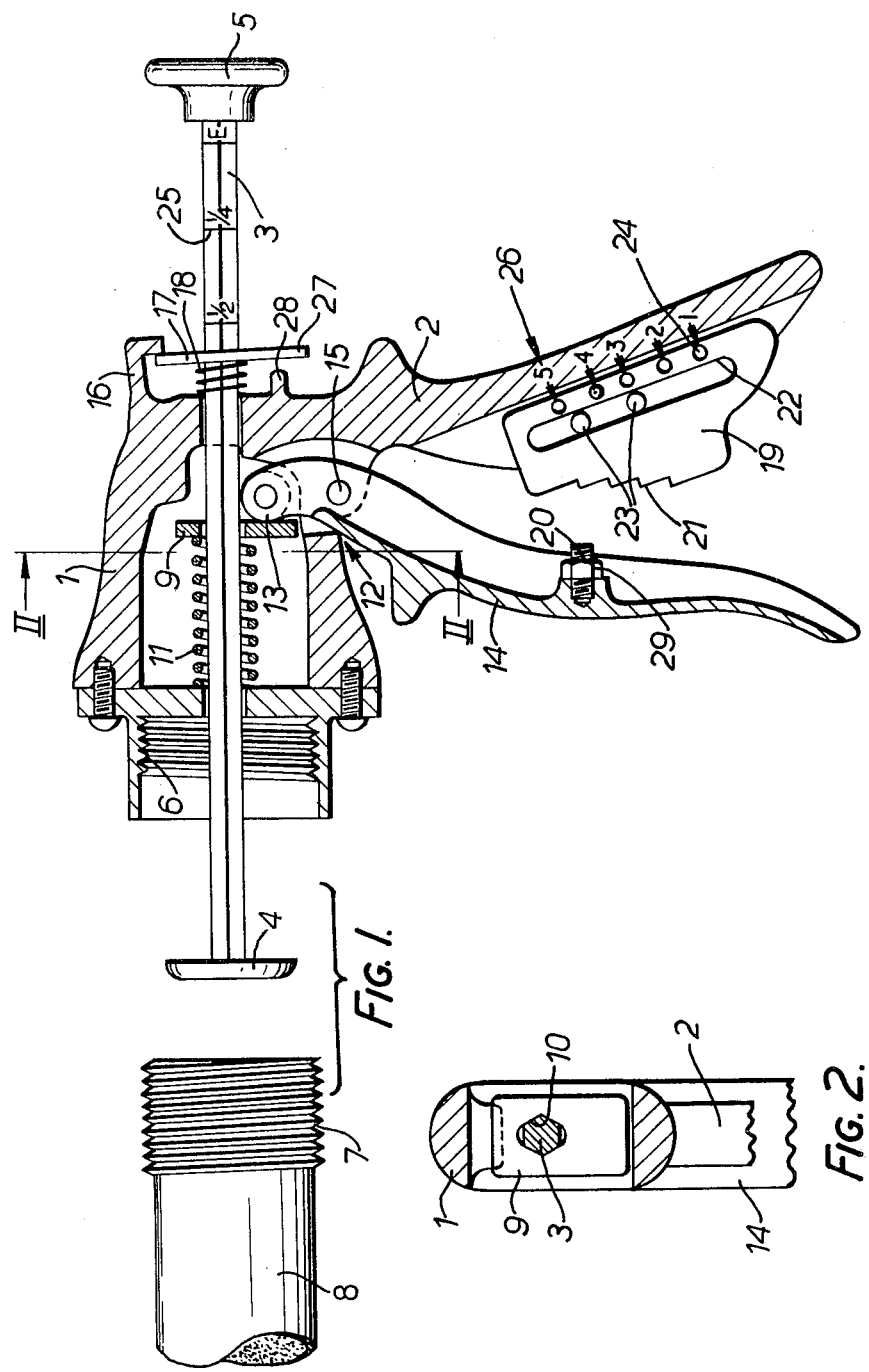

RELATING TO DOSE DETERMINING MEANS OF PASTE DISPENSER

This invention is concerned with devices for dispensing paste materials (i.e. those being fairly viscous) in predefined doses. Where such a dispenser is to be used, for example, for the administration of pasty medicaments to animals, it is of course most important that the dose discharged should be accurate.

Accordingly this invention provides a paste dose dispenser comprising a housing through which passes a rod connected at one end to a plunger within or positioned beyond a housing connection to which a container of paste will be connected, a handle extending from the housing, a pivoted operating lever operable in a direction towards the handle to move the rod in the direction towards the housing connection so as to cause the plunger to dispense paste from a container when connected to the dispenser, and dose determining means comprising a sliding member carried by the handle or the lever and slidably movable to selected positions which determine different degrees of maximum movement of the lever.

With such a dispenser, when the lever is operated, the rod is driven forwardly so as to cause the plunger to act upon paste within a container attached to the dispenser and discharge a dose from the container, whose size will be determined by the degree of movement of the operating lever allowed by the sliding member. In the preferred embodiments, the lever acts on the rod via an operating plate within the housing and surrounding the rod so as to be in contact with the rod, the plate being biased within the housing in a direction away from the housing connection and into contact with the lever. Also it is desired that the dispenser should incorporate movement-limiting means for resisting reverse movement of the rod. When the lever is released, the operating plate will move back to the rest position due to the bias applied to it whilst the rod itself with the associated plunger will normally remain stationary since otherwise a vacuum would be formed between the plunger and the head of the paste in the container. It is possible, however, for the whole body of the paste to move back within the container and in order to avoid this it is preferred that the dispenser should include a second plate surrounding the rod so as to be in contact therewith, the plate being pivotally mounted and biased in a direction away from the housing connection into a position so as to lie at an angle beyond the position normal to the rod axis. Thus when the lever is released, any tendency for reverse movement of the rod will cause the second plate to move into its angled position where it will grip the rod and resist possible further rearward movement of the rod.

Preferably the sliding member will be mounted on the handle and the lever will carry a boss which will contact that part if the sliding member which determines the desired dose. The sliding member may incorporate an angled surface so that, on movement, the distance between the boss and the part of the angled surface which the boss will contact on operation will be varied. Ideally, however, a stepped surface rather than an angled surface will be provided so as to define very precise maximum lever movements at each stepped surface. The boss itself may be adjustably attached to the lever for fine initial adjustment of the dosage levels when calibrating the dispenser. Of course, the position of the sliding member and boss on the handle and lever respectively may be reversed if desired.

In the preferred construction, the sliding member incorporates a slot slidably disposed about a mounting boss or bosses on the handle or lever. Ideally locating means will be provided to hold the sliding member in each of the desired dose determining positions, such as a bull and detent arrangements acting between the sliding member and the handle or lever on which it is mounted. Dosage markings may be carried on the dispenser to indicate the dose which will be dispensed when the sliding member is in each dose determining position.

The invention may be performed in various ways and a preferred embodiment thereof will now be described with reference to the accompanying drawings, in which:

FIG. 1 is a vertical cross-section through a paste dose dispenser constructed in accordance with the invention; and FIG. 2 is a section on line II—II of FIG. 1.

The dose dispenser shown in the drawings incorporates a housing 1 for the operating parts of the dispenser mounted on a fixed handle 2. Passing through the housing and supported thereby is a hexagonal rod 3 carrying a plunger or head 4 at one end and a finger grip portion 5 at the other end. Screwed onto the housing 1 is a housing connection part 6 having an internal screwthread for receipt of the screwthreaded head 7 of a tube 8 of paste to be dispensed by the apparatus. Within the housing 1 a plate 9 is mounted about the rod 3. This plate has a basically rhombic shaped opening 10 therein so that the sides forming the greatest angles of the rhombus are in contact with four of the six faces of the rod 3 (as shown in FIG. 2). The plate 9 is biased by a spring 11 into a rest position against a nylon roller 13 carried at the head end of a lever 14 which is pivotally mounted about a pivot pin 15 on the handle 2, and in turn abuts against a stop surface 12 in the rest position. An extension 16 from the housing 1 provides a pivot support location for a second plate 17 formed with an opening similar to the opening 10 in plate 9 and biased by a light duty return spring 18 into the angled position indicated in FIG. 1.

When the lever 14 is moved towards the handle 2 about the pivot 15 the roller 13 acts on the plate 9 to tilt it about the rod 3 so as to form a gripping or biting contact. Further movement of the lever 14 then pushes the joined plate 9 and rod 3 forwardly so as to force the plunger 4 into the paste tube 8 resulting in a dose of paste being dispensed from an outlet at the other end of the tube 8. The extent of movement of the lever 14 is limited by a dose adjustment plate 19 which will be contacted by a boss 20 carried by the lever 14. This boss will abut against one of a number of stepped stop surfaces 21 carried by the plate 19. The plate 19 can be slidably moved by means of a slot 22 about two mounting bosses 23 to a desired position where it will latch by means of a spring biased ball locating within one of the detents 24 in the handle 2 and it is by this means that the dose to be dispensed is determined. The extent to which the rod 3 has been pushed through the housing 1 is indicated by scale markings 25 on the rod which ideally will be formed on the top of the six sides thereof. Also the dose determined by the position of the plate 19 will be indicated by the scale markings 26.

When the lever 14 is released the heavy duty return spring 11 will push the plate 9 rearwardly within the housing 1 to return the lever 14 to the normal position. However any tendency for the rod 3 to move rearwardly will be resisted due to gripping contact between the sides of the opening in the plate 17 on the rod 3. If it is desired to withdraw the plunger back into the housing connection 6 the plate 17 may be pushed towards the housing until its tip 27 locates against a protuberance 28 so that the plate 17 lies normal to the axis of the rod 3. The rod 3 may then be withdrawn easily by applying force to the finger grip portion 5.

The construction of the dispenser shown in the drawings may be modified in various ways. Thus the parts of the dose determining means, namely the plate 19 and the boss 20, may be transposed on the handle 2 and lever 14. As shown the boss 20 is screwed into the handle 14 and secured there by a lock nut 29. The precise position of the boss 20 may therefore be varied to allow for initial fine adjustments or to allow for wear which may have occurred on the boss 20 or the stepped surfaces 21 and thus ensure that the dosage levels are correct. Also, for example, the cross-sectional shape of the rod 3 could have five or seven sides or have an even greater number of sides but a minimum of five has been found necessary to produce the desired gripping effect due to contact with the sides of the opening 10 in the plate 9 and at least half of the sides of the rod should contact the plate 9. With the rhomboidal shaped hole 10 illustrated in FIG. 2 in combination with the hexagonal rod 3, wear on the rod or the sides of the hole 10 will be compensated for automatically since the plate 9 will be able to tilt further to bring side surfaces of the hole 10 closer to the top and bottom thereof into contact with the sides of the rod 3.

I claim:

1. A paste dose dispenser incorporating a housing, a housing connection on the housing to which a container of paste will be connected, a rod passing through the housing, a plunger connected to the rod and situated within or positioned beyond the housing connection, a first part comprising a handle extending from the housing, a second part comprising a pivoted operating lever linked with the rod and operable in a direction towards the handle so as to move the rod in the direction towards the housing connection and cause the plunger to dispense paste from a container when connected to the dispenser; and dose determining means comprising a sliding member carried by one of the two parts and provided with a slot along the length thereof receiving a mounting boss carried by the said one of the two parts to permit the sliding member to be slidably movable to selected positions which determine different degrees of maximum movement of the lever and thus determine maximum doses of paste to be dispensed, an abutment boss adjustably carried by the other of the two parts for fine initial adjustment of the dosage levels and which will contact that part of the sliding member which determines the desired dose, and wherein the sliding member incorporates a stepped surface to be contacted by the abutment boss, with each step determining a maximum degree of movement of the lever, and locating means including ball and detent arrangements on the said one of the two parts and the sliding member symmetrically spaced relative to the steps of said stepped surface and disposed along the length of the slot in said sliding member for holding the sliding member in a selected predetermined dose determining position for the abutment boss to contact the selected step.

2. A paste dose dispenser according to claim 1, including dosage markings carried on the dispenser to indicate the maximum dose which will be dispensed when the sliding member is in each dose determining position.

3. A paste dose dispenser according to claim 1, including an operating plate within the housing and surrounding the rod so as to be in contact with the rod, the plate being biased within the housing in a direction away from the housing connection and into contact with the lever, thus enabling the lever to act on the rod via the plate.

4. A paste dose dispenser according to claim 1, including movement-limiting means for resisting reverse movement of the rod.

5. A paste dose dispenser according to claim 4, wherein the movement-limiting means comprises a second plate surrounding the rod so as to be in contact therewith, the plate being pivotally mounted and biased in a direction away from the housing connection into a position so as to lie at an angle beyond the position normal to the rod axis.

* * * * *